(12) United States Patent
Imanaka

(10) Patent No.: US 11,476,490 B2
(45) Date of Patent: Oct. 18, 2022

(54) CELL STACK DEVICE, MODULE, AND MODULE HOUSING DEVICE

(71) Applicant: KYOCERA Corporation, Kyoto (JP)

(72) Inventor: Kazuya Imanaka, Kirishima (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 17/041,118

(22) PCT Filed: Mar. 13, 2019

(86) PCT No.: PCT/JP2019/010304
§ 371 (c)(1),
(2) Date: Sep. 24, 2020

(87) PCT Pub. No.: WO2019/188299
PCT Pub. Date: Oct. 3, 2019

(65) Prior Publication Data
US 2021/0119243 A1      Apr. 22, 2021

(30) Foreign Application Priority Data
Mar. 28, 2018   (JP) .............................. JP2018-062281

(51) Int. Cl.
*H01M 8/2485*   (2016.01)
*H01M 8/0271*   (2016.01)
(Continued)

(52) U.S. Cl.
CPC ....... *H01M 8/2485* (2013.01); *H01M 8/0271* (2013.01); *H01M 8/2457* (2016.02); *H01M 8/2475* (2013.01)

(58) Field of Classification Search
None
See application file for complete search history.

(56) References Cited

U.S. PATENT DOCUMENTS

| 8,993,194 B2 | 3/2015 | Fujimoto et al. |
| 9,780,382 B2 | 10/2017 | Hori |

(Continued)

FOREIGN PATENT DOCUMENTS

| JP | 2013-051151 A | 3/2013 |
| JP | 2014-006962 A | 1/2014 |

(Continued)

OTHER PUBLICATIONS

JP-2017204327-A translation (Year: 2017).*
JP-2014049248-A translation (Year: 2014).*
Translation of JP2015088321A (Year: 2015).*

*Primary Examiner* — Ula C Ruddock
*Assistant Examiner* — Amanda Rosenbaum
(74) *Attorney, Agent, or Firm* — Procopio, Cory, Hargraves & Savitch LLP

(57) ABSTRACT

A cell stack device according to the present disclosure includes: a cell stack comprising a plurality of cells; and a manifold configured to supply reaction gas to the plurality of cells, wherein each of the plurality of cells includes: an element part comprising: a fuel electrode layer that is located on the fuel electrode layer; a solid electrolyte layer that is located on the fuel electrode layer; a middle layer that is located on the solid electrolyte layer; and an air electrode layer that is located on the middle layer, the middle layer including: a first middle layer bonded to the solid electrolyte layer; and a second middle layer bonded to the air electrode layer; and a non-element part of the cell that comprises the entire cell excluding the air electrode layer, the non-element part located at least at a first of both ends of the plurality of cells in a longitudinal direction, and the plurality of cells is fixed to the manifold at least at the first end by a sealing material located between the manifold and either the solid electrolyte layer or the first middle layer.

5 Claims, 7 Drawing Sheets

(51) Int. Cl.
*H01M 8/2457* (2016.01)
*H01M 8/2475* (2016.01)
*H01M 8/1213* (2016.01)
*H01M 8/2465* (2016.01)

(56) References Cited

U.S. PATENT DOCUMENTS

| | | | |
|---|---|---|---|
| 10,651,476 B2 | 5/2020 | Imanaka | |
| 2010/0266925 A1* | 10/2010 | Hori | H01M 8/1213 |
| | | | 429/465 |
| 2012/0186976 A1* | 7/2012 | Laucournet | H01M 8/0243 |
| | | | 204/252 |
| 2012/0225368 A1* | 9/2012 | Ohmori | H01M 4/8657 |
| | | | 429/481 |
| 2014/0080029 A1* | 3/2014 | Hori | H01M 8/0282 |
| | | | 429/465 |
| 2014/0377683 A1 | 12/2014 | Inoue | |

FOREIGN PATENT DOCUMENTS

| | | | |
|---|---|---|---|
| JP | 2014-026926 A | | 2/2014 |
| JP | 2014-49248 A | | 3/2014 |
| JP | 2014049248 A | * | 3/2014 |
| JP | 2015088321 A | * | 5/2015 |
| JP | 2016-207539 A | | 12/2016 |
| JP | 6105824 B1 | | 3/2017 |
| JP | 2017204327 A | * | 11/2017 |
| WO | 2008/023805 A1 | | 2/2008 |

* cited by examiner

CELL STACK DEVICE, MODULE, AND MODULE HOUSING DEVICE

FIELD

The present disclosure relates to a cell stack device, a module, and a module housing device.

BACKGROUND

Recently, as the next generation energy, there has been proposed a fuel battery cell stack device in which a plurality of fuel battery cells, which is a kind of cell capable of obtaining electric power by using fuel gas (gas containing hydrogen) and gas containing oxygen (air), is arranged and fixed to a manifold (see Patent Literature 1, for example).

Moreover, there have been proposed various devices such as a fuel battery module in which the fuel battery cell stack device is housed in its storage container, and a fuel battery device in which the fuel battery module is housed in its external case (see Patent Literature 1, for example).

CITATION LIST

Patent Literature

Patent Literature 1: Japanese Patent No. 6105824

SUMMARY

Solution to Problem

A cell stack device according to the present disclosure includes: a cell stack comprising a plurality of cells; and a manifold configured to supply reaction gas to the plurality of cells, wherein each of the plurality of cells includes: an element part comprising: a fuel electrode layer that is located on the fuel electrode layer; a solid electrolyte layer that is located on the fuel electrode layer; a middle layer that is located on the solid electrolyte layer; and an air electrode layer that is located on the middle layer, the middle layer including: a first middle layer-bonded to the solid electrolyte layer; and a second middle layer bonded to the air electrode layer; and a non-element part of the cell that comprises the entire cell excluding the air electrode layer, the non-element part located at least at a first of both ends of the plurality of cells in a longitudinal-direction, and the plurality of cells is fixed to the manifold at least at the first end by a sealing material located between the manifold and either the solid electrolyte layer or the first middle layer.

A module according to the present disclosure is configured such that the above-mentioned cell stack device is housed in a storage container.

A module housing device according to the present disclosure is configured such that the above-mentioned module and an auxiliary configured to drive the module are housed in an external case.

DESCRIPTION OF EMBODIMENTS

A cell, a cell stack device, a module, and a module housing device will be explained with reference to FIGS. 1 to 12.

Cell

Hereinafter, a solid-oxide fuel battery cell is exemplified as a cell constituting a cell stack.

Figure 1A:
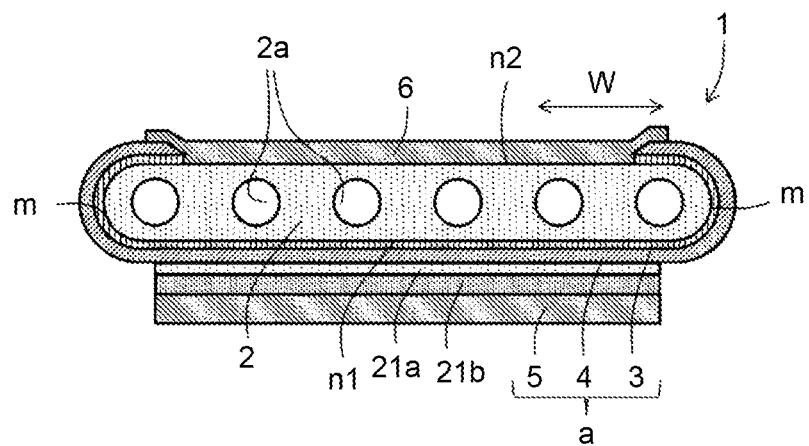
FIG. 1A is a lateral-cross-sectional view illustrating one example of a cell according to embodiments.
Figure 1B:
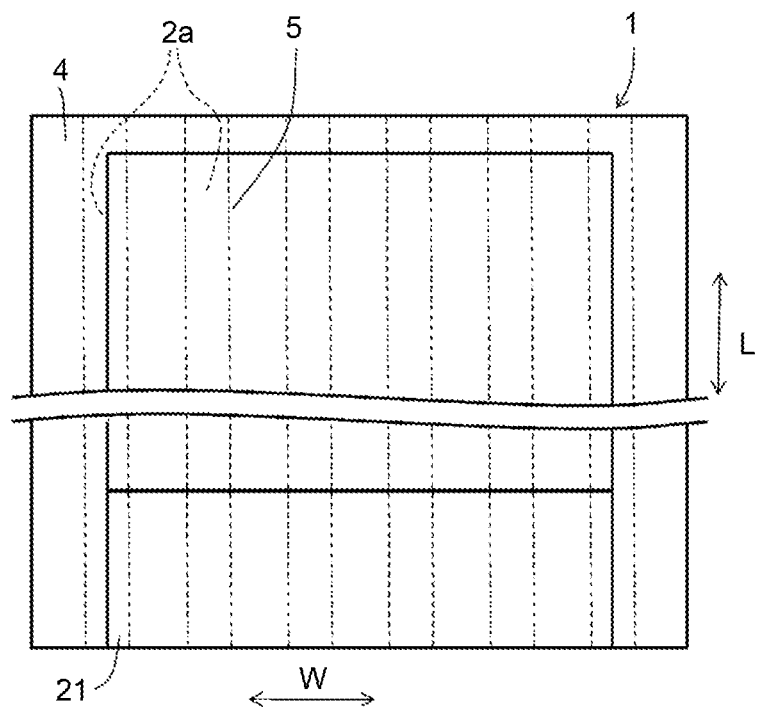
FIG. 1B is a side view illustrating one example of the cell according to the embodiments.
Figure 2:
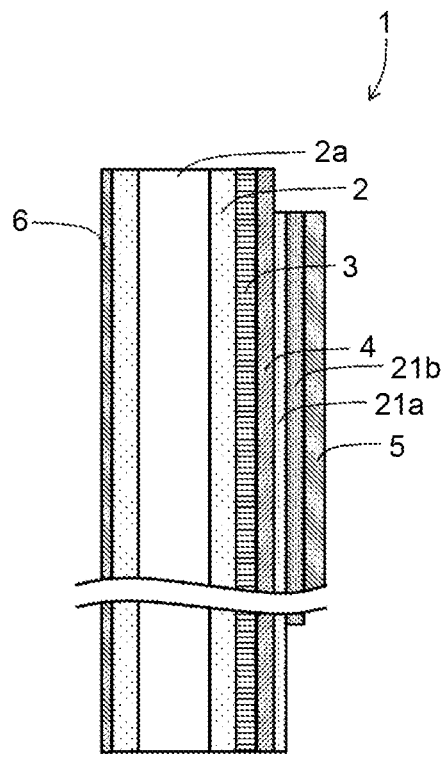
FIG. 2 is a longitudinal-cross-sectional view illustrating the cell illustrated in FIG. 1A.

FIG. 1A is a lateral-cross-sectional view illustrating one example of a cell according to embodiments. FIG. 1B is a side view illustrating one example of the cell according to the embodiments. FIG. 2 is a longitudinal-cross-sectional view illustrating the cell illustrated in FIG. 1A. In both of the drawings, each of configurations of a cell 1 is indicated in an enlarged manner.

In the example illustrated in FIGS. 1A and 1B, the cell 1 is hollow plate-shaped, and further elongated plate-shaped. As illustrated in FIG. 1B, the whole cell 1 in its side view is rectangular-shaped in which a length of a side in a length direction L is 5 to 50 cm and a length of a side in a width direction W, which is perpendicular to the length direction, is 1 to 10 cm, for example. A thickness of the whole cell 1 is 1 to 5 mm.

As illustrated in FIG. 1A, the cell 1 includes, on a flat surface n1 of a columnar (for example, hollow plate-shaped) conductivity support substrate (hereinafter, may be referred to as "support substrate 2") having a pair of opposing flat surfaces n1 and n2, an element part a in which a fuel electrode layer 3, a solid electrolyte layer 4, and an air electrode layer 5 are laminated. Hereinafter, a portion of the cell 1 that includes the entire cell 1 excluding the air electrode layer 5 may be referred to as "non-element part".

In the example illustrated in FIG. 1A, an inter-connector 6 is arranged on the other flat surface n2 of the cell 1.

As illustrated in FIG. 2, the cell 1 according to the present disclosure includes a middle layer that includes a first middle layer 21a and a second middle layer 21b. The first middle layer 21a is arranged between the solid electrolyte layer 4 and the air electrode layer 5, and is bonded to the solid electrolyte layer 4. The second middle layer 21b has a thickness larger than that of the first middle layer 21a, and is bonded to the air electrode layer 5. Hereinafter, the first middle layer 21a and the second middle layer 21b may be collectively referred to as "middle layer 21".

Hereinafter, configuration members constituting the cell 1 will be explained.

Gas flow paths 2a inside of which gas flows are provided in the support substrate 2, and an example is illustrated in FIG. 1 in which the six gas flow paths 2a are provided.

The support substrate 2 has gas permeability for transmitting fuel gas to the fuel electrode layer 3, and further has conductivity for performing current collection via the inter-connector 6.

The support substrate 2 contains an iron-group metal component and an inorganic oxide, for example. The iron-group metal component is Ni and/or NiO, and the inorganic oxide is a specific rare earth oxide, for example. The specific rare earth oxide is used for bringing a thermal expansion coefficient of the support substrate 2 close to a thermal expansion coefficient of the solid electrolyte layer 4, and a rare earth oxide is used, which includes at least one element selected from a group including Y, Lu, Yb, Tm, Er, Ho, Dy, Gd, Sm, and Pr, for example. As a specific example of such a rare earth oxide, there may be exemplified $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. In the embodiments, a volume ratio is prepared to Ni and/or NiO:rare earth oxide=35:65 to 65:35 in order to maintain a well electric conductivity of the support substrate 2 and further to bring a thermal expansion coefficient of the support substrate 2 close to that of the solid electrolyte layer 4.

In the cell 1 illustrated in FIGS. 1A and 1B, the columnar (hollow plate-shaped) support substrate 2 is a plate-shaped body elongated in its standing direction, and has the flat surfaces n1 and n2 and semicircular-shaped side surfaces m.

In order to provide the gas permeability, an open porosity of the support substrate 2 may be within a range of equal to or more than 30%, particularly 35 to 50%. The electric conductivity of the support substrate 2 may be equal to or more than 300 S/cm, particularly equal to or more than 440 S/cm.

A generally well-known material may be employed for the fuel electrode layer 3, and there may be used a porous conductive ceramic, such as $ZrO_2$ (may be referred to as stabilized zirconia including partially-stabilized $ZrO_2$) into which a rare earth element oxide is solid-dissolved, and Ni and/or NiO. For the rare earth oxide, for example, $Y_2O_3$ and the like may be employed.

The solid electrolyte layer 4 has a function as electrolyte that is a bridge for an electron between the fuel electrode layer 3 and the air electrode layer 5 and gas shut-off properties for preventing leakage of fuel gas and gas containing oxygen, and is formed of $ZrO_2$ into which 3 to 15 mol % of a rare earth element oxide is solid-dissolved, for example. As the rare earth oxide, for example, $Y_2O_3$ and the like may be employed. Note that another material may be employed as long as the above-mentioned features are ensured.

The air electrode layer 5 is not particularly limited as long as it is generally used, and a conductive ceramic made of i.e. $ABO_3$ perovskite-type oxide may be employed, for example. Moreover, a composite oxide in which Sr and La are coexisting at A sites may be employed, for example. As an example, $La_xSr_{1-x}Co_yFe_{1-y}O_3$, $La_xSr_{1-x}MnO_3$, $La_xSr_{1-x}FeO_3$, $La_xSr_{1-x}CoO_3$, and the like may be exemplified. Note that x satisfies 0<x<1, and y satisfies 0<y<1. The air electrode layer 5 has gas permeability, and an open porosity thereof may be within a range of equal to or more than 20%, particularly 30 to 50%.

For the inter-connector 6, for example, a lanthanum-chromite perovskite-type oxide ($LaCrO_3$-type oxide) or a lanthanum-strontium-titanium perovskite-type oxide ($LaSrTiO_3$-type oxide) may be employed. Each of the materials has conductivity, and is not reduced or oxidized even when being exposed to fuel gas (gas containing hydrogen) or gas containing oxygen (air and the like). The inter-connector 6 is dense so as to prevent leakage of fuel gas flowing through the gas flow paths 2a formed in the support substrate 2 or gas containing oxygen flowing through an outside of the support substrate 2, and has a relative density of equal to or more than 93%, particularly equal to or more than 95%.

The middle layer 21 is made of $CeO_2$-type sintered body containing a rare earth element oxide other than Ce, and preferably has a composition indicated by $(CeO_2)_{1-x}(REO_{1.5})_x$ (in the formula, RE is at least one selected from among Sm, Y, Yb, and Gd, and x is number that satisfies 0<x≤0.3), for example. The middle layer 21 has a role as a reaction preventing layer that prevents a reaction of a component of the solid electrolyte layer 4 and a component of the air electrode layer 5 between the solid electrolyte layer 4 and the air electrode layer 5 that leads to generation of a reaction layer having a high electric resistance. For example, the role includes preventing a reaction between Sr contained in the air electrode layer 5 and Zr contained in the solid electrolyte layer 4. Furthermore, in order to reduce an electric resistance, Sm or Gd may be employed as RE, for example, $CeO_2$ into which 10 to 20 mol % of $SmO_{1.5}$ or $GdO_{1.5}$ is solid-dissolved may be employed. Moreover, the middle layer 21 may have a two-layer structure.

Herein, the middle layer 21 includes the first middle layer 21a and the second middle layer 21b. A porosity of the first middle layer 21a may be equal to or less than 25%, and a thickness thereof may be 0.5 to 10 μm, for example. Thus, it is possible to efficiently prevent diffusion of components of the solid electrolyte layer 4. As described below, a porosity of a part of the first middle layer 21a, to which a sealing material is provided, may be 10 to 30%. Thus, it is possible to improve bonding force to the sealing material.

A porosity of the second middle layer 21b may be higher than that of a part of the first middle layer 21a which is arranged between the solid electrolyte layer 4 and the air electrode layer 5. Specifically, the porosity may be 10 to 30%, for example. A thickness of the second middle layer 21b may be larger than that of the first middle layer 21a, and may be 1 to 20 μm, for example.

The above-mentioned porosity may be measured by using the following method. First, i.e. a "resin embedding" treatment is performed on the cell 1 so that resin enters into pores of the whole cell 1. Mechanical polishing is performed on the flat surfaces n1 and n2 of the cell 1 on which the "resin embedding" treatment has been performed. Caused by the polishing, a cross section of the solid electrolyte layer 4 and the middle layer 21 is obtained. Microstructure of the cross section is observed by using a scanning electron microscope, and image processing is executed on the obtained image so as to calculate an area of pore part (part into which resin has entered) and an area of non-pore part (part into which resin has not entered). A ratio of "area of pore part" to "whole area (sum of area of pore part and area of non-pore part)" is defined as "porosity" of the middle layer 21 and the solid electrolyte layer 4. Note that in the middle layer 21, when calculating a porosity of a part into which a sealing material 8 has entered, a pore into which the sealing material 8 has entered is counted as the pore part similarly to a pore into which the resin has entered.

Cell Stack Device

Next, a cell stack device according to the embodiments of the present disclosure, for which the above-mentioned cell is employed, will be explained with reference to FIGS. 3, 4A, and 4B.

Figure 3:
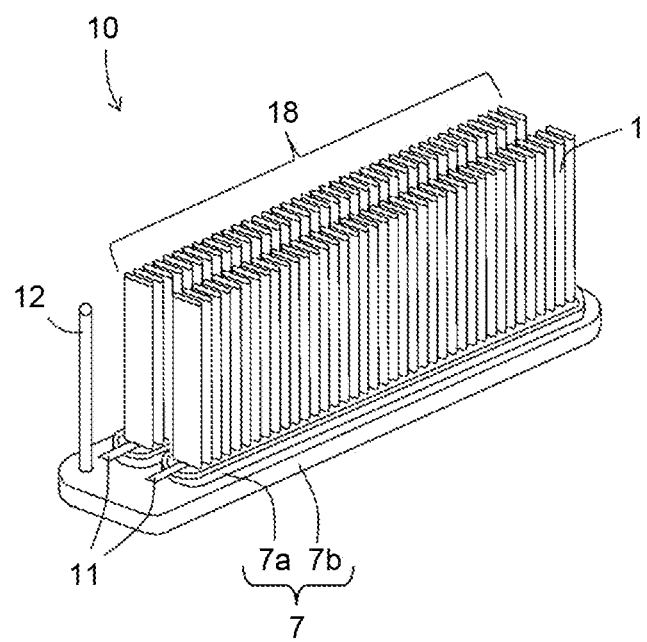
FIG. 3 is a perspective view illustrating one example of a cell stack device according to the embodiments.

FIG. 3 is a perspective view illustrating one example of a cell stack device according to the embodiments. FIG. 4A is a cross-sectional view illustrating one example of the cell stack device according to the embodiments. FIG. 4B is an enlarged cross-sectional view illustrating a part of the cross-sectional view illustrated in FIG. 4A.

A cell stack device 10 includes the plurality of aligned cells 1 and a manifold 7.

One end of the plurality of cells 1 is fixed to the manifold 7 by using the sealing material 8 so as to supply reaction gas to the plurality of cells 1.

Figure 4A:
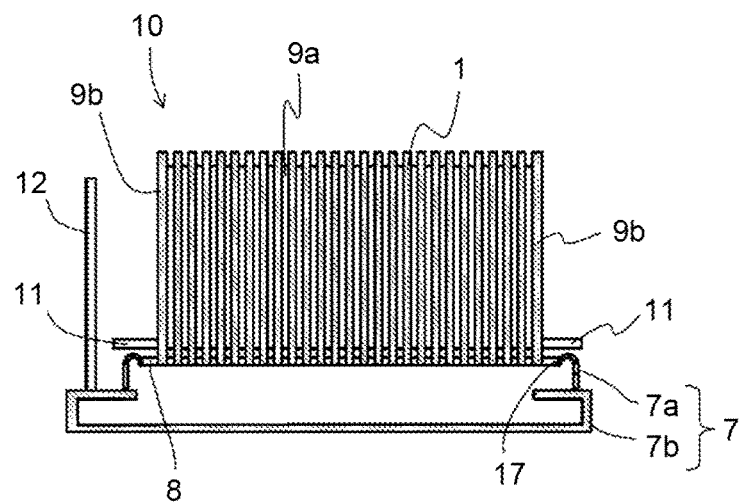
FIG. 4A is a cross-sectional view illustrating one example of the cell stack device according to the embodiments.
Figure 4B:
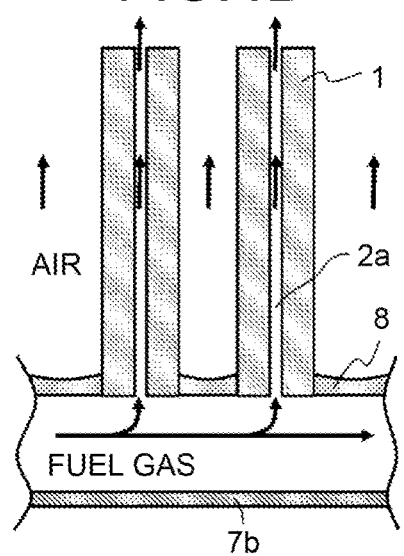
FIG. 4B is an enlarged cross-sectional view illustrating a part of the cross-sectional view illustrated in FIG. 4A.

In the examples illustrated in FIGS. 3, 4A, and 4B, the manifold 7 includes a support 7a and a gas tank 7b. Fuel gas is stored in an internal space formed by the support 7a and the gas tank 7b. A gas flow tube 12 is provided to the gas tank 7b, fuel gas that is generated by a reformer 13 to be mentioned later is supplied to the manifold 7 via the gas flow tube 12, and then the fuel gas is supplied, from the manifold 7, to the gas flow paths 2a in the cells 1.

Each of the cells 1 protrudes along a longitudinal direction of the cells 1 from the manifold 7, and the plurality of cells 1 is aligned in such a manner that the flat surfaces n1 and n2 are oppositely overlapped with each other (namely, in stacked manner). One end of each of the cells 1 in its longitudinal direction is fixed to the support 7a by using the sealing material 8.

In the example illustrated in FIGS. 3, 4A, and 4B, a lower end part of the support 7a is bonded to the gas tank 7b. The support 7a includes a single insertion hole 17 that is communicated with an internal space of the gas tank 7b. One ends of the plurality of cells 1 that are aligned in a row are inserted into the insertion hole 17.

In the example illustrated in FIGS. 3, 4A, and 4B, the plurality of cells 1 is arranged in two rows, and each of the rows is individually fixed to the support 7a. In this case, two through holes are arranged on an upper surface of the gas tank 7b. The supports 7a are provided to the respective through holes so as to coincide with the insertion holes 17. As a result, an internal space is formed by the single gas tank 7b and the two supports 7a.

The insertion hole 17 is oval-shaped in the top view, for example. It is sufficient that the insertion hole 17 is longer than a distance between two end-part conductive members 9b in an alignment direction of the cells 1, for example. Moreover, it is sufficient that a width of the insertion hole is longer than a length of the cell 1 in the width direction W, for example.

As illustrated in FIGS. 4A and 4B, there present a gap between an inner wall of the insertion hole 17 and an outer surface of the cell 1, and a gap between the cells 1. As illustrated in FIGS. 4A and 4B, in a bonding part between the insertion hole 17 and one end of the cell 1, the gap is filled with the solidified sealing material 8. Thus, the insertion hole 17 and one ends of the plurality of cells 1 are bonded and fixed to each other. As illustrated in FIG. 4B, one end of the gas flow path 2a of each of the cells 1 is communicated with an internal space of the manifold 7.

As material of the sealing material 8, amorphous glass, metal brazing material, or the like may be employed; moreover, crystallized glass may be employed. As the crystallized glass, for example, $SiO_2$—$B_2O_3$ type, $SiO_2$—$CaO$ type, or $MgO$—$B_2O_3$ type may be employed; moreover, $SiO_2$—$MgO$ type is most preferable. In this specification, crystallized glass indicates glass (ceramic) in which a ratio (crystallinity) of "volume occupied by crystal phase" to the whole volume is equal to or more than 60% and a ratio of "volume occupied by amorphous phase and impurities" to the whole volume is less than 40%. Specifically, the crystallinity of crystallized glass is able to be obtained by, for example, "identifying a crystal phase by using XRD and the like, and then calculating a volume ratio of a crystal phase region based on observation result of structure and/or composition distribution of the crystallized glass using SEM and EDS, or SEM and EPMA, etc."

As indicated by the example illustrated in FIG. 4A, a conductive member 9a for electrically connecting the adjacent cells 1 (more specifically, fuel electrode layer 3 of one of adjacent cells 1 and air electrode layer 5 of the other of adjacent cells 1) in serial is arranged between the adjacent cells 1. Note that in FIGS. 3, 4B, and 5, illustration of the conductive member 9a is omitted.

Furthermore, as indicated by the example illustrated in FIG. 4A, the end-part conductive members 9b are connected with the cells 1 positioned on outermost sides in the alignment direction of the plurality of cells 1. Each of the end-part conductive members 9b includes a conductive part 11 protruding toward the outside from the cell stack. The conductive part 11 has a function of performing current collection on electricity that is generated by power generation of the cells 1 and further leading the collected electricity to the outside.

Hereinafter, as illustrated in FIG. 4B, when the cell stack device 10 of the above-mentioned fuel battery is operating, fuel gas (hydrogen etc.) at a high temperature (for example, 600 to 800° C.) and "gas containing oxygen (air etc.)" flow therethrough. The fuel gas is led to the internal space of the manifold 7, and then led, via the insertion hole 17, to the gas flow path 2a of each of the plurality of cells 1. The fuel gas having passed through the gas flow paths 2a is ejected to the outside from the other ends (free ends) of the gas flow paths 2a. The air flows, in the longitudinal direction of the cells 1, along a gap between the adjacent cells 1.

Figure 5:
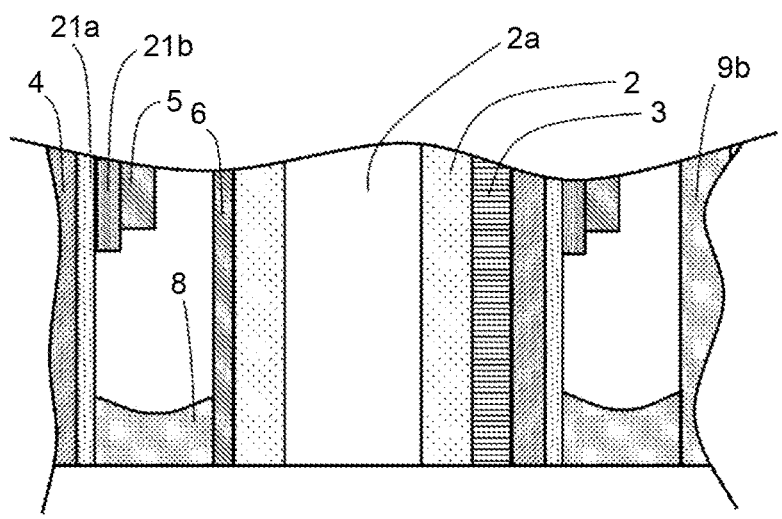
FIG. 5 is an enlarged cross-sectional view illustrating a bonding part between an insertion hole and one end of the cell.

FIG. 5 is an enlarged cross-sectional view illustrating a bonding part between an insertion hole and one end of the cell in the cell stack device according to the embodiments.

In the cell stack device according to the embodiments, a case is exemplified in which the sealing material 8 is not bonded to the second middle layer 21b, and the sealing material 8 is bonded to the first middle layer 21a.

For example, when the first middle layer 21a and the second middle layer 21b are made of $CeO_2$ (hereinafter, may be referred to as GDC) into which $GdO_{1.5}$ is solid-dissolved and the sealing material 8 is made of $SiO_2$—$MgO$ crystallized glass, there presents, however slightly, difference between a thermal expansion coefficient of the glass and that of the GDC. Thus, the sealing material 8 is bonded to the first middle layer 21a whose thickness is small without bonding the sealing material 8 to the second middle layer 21b whose thickness is large, so that effects of a thermal expansion coefficient of GDC is able to be small. Hence, it is possible to prevent peeling between the GDC and the glass, and generation of a gap in a boundary therebetween. In other words, it is possible to prevent leakage of the fuel gas.

In this case, the middle layer 21 including the second middle layer 21b may be configured to extend closer to the one-end side (manifold 7 side) than the air electrode layer 5. Thus, an area of the middle layer 21 is able to be large, so that it is possible to efficiently prevent a case where a component of the solid electrolyte layer 4 and that of the air electrode layer 5 react with each other to form a reaction layer having a high electric resistance.

Incidentally, for example, when difference in a thermal expansion coefficient between the middle layer 21 and the sealing material 8 is smaller than that between the solid electrolyte layer 4 and the sealing material 8, the sealing material 8 may be bonded to the solid electrolyte layer 4 alone without bonding the sealing material 8 to the middle layer 21.

Figure 6:
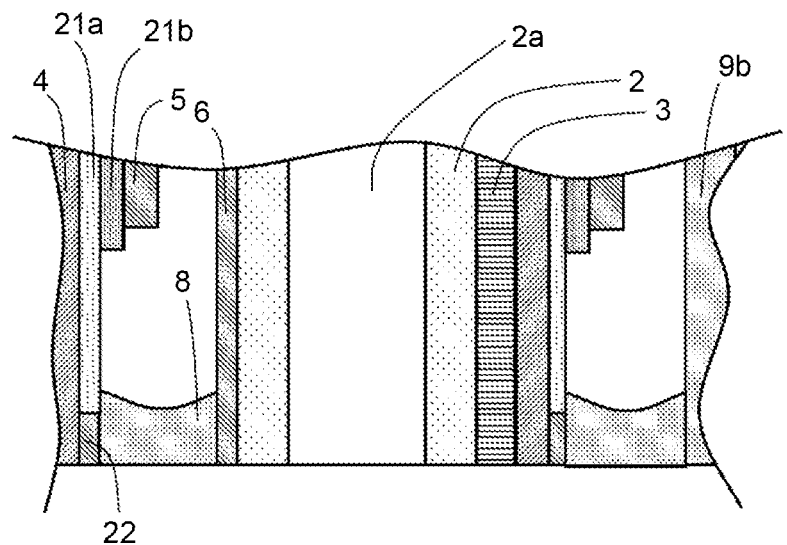
FIG. 6 is an enlarged cross-sectional view illustrating another example of the bonding part between the insertion hole and the one end of the cell.

FIG. 6 is an enlarged cross-sectional view illustrating another example of the bonding part between the insertion hole and the one end of the cell in the cell stack device according to the embodiments.

In the cell 1 illustrated in FIG. 6, there is arranged, on the solid electrolyte layer 4 of the one end, a first layer 22 containing a component, as a main component, whose content of a rare earth element is different from that of a main component of the solid electrolyte layer 4.

In the cell stack device according to the embodiments, the one ends of the cells 1 alone are bonded to the manifold 7 by using the sealing material 8. Thus, this bonding part is stressed most during manufacturing process and/or power generation driving. Thus, it is preferable that the strength of the one ends is high.

In the cell 1 illustrated in FIG. 6, there is provided the first layer 22 containing a component, as a main component, whose content of a rare earth element is different from that of a main component of the solid electrolyte layer 4. Note that in a state where a content of a rare earth element is different from that of a main component of the solid electrolyte layer 4, when a main component of the solid electrolyte layer 4 is $ZrO_2$ into which a rare earth element oxide is solid-dissolved, a content of a rare earth element of the first layer 22 may be smaller than that of the solid electrolyte layer 4, for example. When a main component of the solid electrolyte layer 4 is $CeO_2$ into which a rare earth element oxide is solid-dissolved, a content of a rare earth element of the first layer 22 may be larger than that of the solid electrolyte layer 4. Thus, strength of the one ends of the cells 1 is able to be improved, so that it is possible to prevent breakage in the cell 1.

With respect to measurement of the strength, for example, by using an ultra-micro-hardness tester, an indenter is pushed, with the same load, into portions in which the solid electrolyte layer 4 and the first layer 22 are exposed in the cell 1 that is fractured and mirror-finished, and the maximum indentation depths are measured to make a determination.

The first layer 22 and the first middle layer 21a are bonded to each other. Thus, an area of the first middle layer 21a is able to be large while increasing strength of the cell 1, so that it is possible to efficiently prevent breakage in the cell 1 and generation of a reaction layer having a high electric resistance.

In FIG. 6, the example is illustrated in which the first layer 22 and the first middle layer 21a are bonded to each other via surfaces thereof; however, not limited thereto. For example, when an area of the first middle layer 21a is set to be large, first layer 22 may be arranged to overlap on the first middle layer 21a. On the other hand, the first middle layer 21a may be arranged to overlap on the first layer 21.

In the cell stack device illustrated in FIG. 6, the sealing material 8 is bonded to the first middle layer 21a and the first layer 22 so as to fix the cell 1 to the manifold 7. Thus, the stress generated in the sealing material 8 is able to be dispersed, so that it is possible to prevent peeling between the middle layer 21 and the sealing material 8 glass, and generation of a gap in a boundary therebetween. In other words, it is possible to reliably prevent leakage of the fuel gas.

Manufacturing Method

One example of fabricating methods of the above-mentioned cell 1 and the cell stack device 10 according to the embodiments will be explained. Note that various conditions to be mentioned later may be appropriately changed, such as materials, particle diameters, temperatures, and coating methods. Hereinafter, "molded body" means one in a state before firing.

First, for example, Ni and/or NiO powder, rare earth oxide powder such as $Y_2O_3$, organic binder, and solvent are mixed to prepare a body paste, and extrusion molding is performed on the body paste to fabricate a support molded body, and the support molded body is dried. Note that a calcined body obtained by calcining for 2 to 6 hours at 900 to 1000° C. may be used as the support molded body.

Next, for example, in accordance with a predetermined formulation composition, raw materials of NiO and $ZrO_2$ (YSZ) into which $Y_2O_3$ is solid-dissolved are weighed and mixed. Next, the mixed powder is mixed with organic binder and solvent to prepare slurry for a fuel electrode layer.

Slurry obtained by adding powder of $ZrO_2$ into which $Y_2O_3$ is solid-dissolved to toluene, binder powder (hereinafter, higher molecular than binder powder adhering to $ZrO_2$ powder, for example, acrylic resin), commercially available dispersing agent, etc. is formed to fabricate a sheet-like solid electrolyte layer molded body by a method such as the doctor blade method.

The obtained sheet-like solid electrolyte layer molded body is coated with slurry for a fuel electrode layer and then dried so as to form a fuel electrode layer molded body, and then a sheet-like laminated molded body is formed. A surface of the sheet-like laminated molded body of the fuel electrode layer molded body and the solid electrolyte layer molded body, which is closer to the fuel electrode layer molded body, is laminated on the support molded body so as to form a molded body. The molded body is calcined for 2 to 6 hours at 800 to 1200° C.

Subsequently, material of an inter-connector layer (for example, $LaCrMgO_3$-type oxide powder), organic binder, and solvent are mixed to fabricate slurry. Regarding the later processes, a fabricating method of a cell including an adhesion layer will be explained.

Next, a middle layer to be arranged between a solid electrolyte layer and an air electrode layer is formed. For example, a thermal treatment is performed on $CeO_2$ powder into which $GdO_{1.5}$ is solid-dissolved for 2 to 6 hours at 800 to 900° C. so as to prepare raw material powder for a middle layer molded body, toluene as solvent is added thereto so as to fabricate slurry for a middle layer, and this slurry is coated on the solid electrolyte layer molded body by a predetermined area so as to fabricate a first middle layer molded body. Next, slurry for an inter-connector layer is coated on an upper surface of a support molded body so that both end parts of a molded body for an inter-connector layer is laminated on both end parts of the solid electrolyte layer molded body, and thus a laminated molded body is fabricated.

Next, a debinding treatment is performed on the above-mentioned laminated molded body, and simultaneous sintering (simultaneous firing) is performed thereon for 2 to 6 hours at 1400 to 1450° C. under gas containing oxygen.

Next, the above-mentioned slurry for a middle layer is coated on a surface of the formed first middle layer sintered body so as to fabricate a molded body of the second middle layer 21b and then the molded body is sintered. Note that sintering of the molded body of the second middle layer 21b is preferably performed at a temperature lower than that of the above-mentioned simultaneous sintering, and may be performed at 1100 to 1300° C., for example. A sintering time interval may be 2 to 6 hours.

Subsequently, for example, $La_xSr_{1-x}Co_yFe_{1-y}O_3$ (hereinafter, simply referred to as LSCF) powder having a predetermined particle diameter, organic binder, pore forming material, and solvent are mixed to fabricate slurry for an air electrode layer. This slurry is coated on a solid electrolyte layer by screen printing so as to form a molded body for an air electrode layer.

Next, a laminated body in which the molded body for an air electrode layer is formed on the solid electrolyte layer is fired for 1 to 3 hours at 1100 to 1200° C. In this way, the cell 1 according to the embodiments having the structure illustrated in FIG. 2 is manufactured.

Next, hydrogen gas is supplied to a gas flow path of the cell 1 to be able to perform a reduction treatment on the support substrate 2 and the fuel electrode layer 3. In this case, the reduction treatment may be performed for 5 to 20 hours at 750 to 1000° C., for example.

When the first layer is provided, slurry for the first layer, whose content of a rare earth element oxide is different from that of slurry for a solid electrolyte layer molded body, is fabricated and the fabricated slurry may be coated on a calcined body obtained by calcining the solid electrolyte layer molded body and the fuel electrode layer molded body, and may be dried to fabricate a first layer molded body.

The above-mentioned cell stack device 10 is assembled by the following procedure, for example. First, a necessary number of the completed cells 1 and the support 7a are prepared. Next, the plurality of cells 1 is aligned and fixed in a stacked manner by using a predetermined jig and the like. Next, one ends of the plurality of cells 1 are inserted into the insertion hole 17 of the support 7a at once while maintaining the above-mentioned state. Next, a gap of a bonding part between the insertion hole 17 and one ends of the plurality of cells 1 is filled with paste for the sealing material 8 (typically, paste of amorphous material, e.g. amorphous glass).

Next, a thermal treatment (crystallization treatment) is performed on the paste for the sealing material 8 having filled as described above. When a temperature of the amorphous material reaches its crystallization temperature by the thermal treatment, a crystal phase is generated in the material under the crystallization temperature, and crystallization is advancing. As a result, the amorphous material is solidified and becomes ceramic to change into crystallized glass. Thus, one ends of the plurality of cells 1 are bonded and fixed to the insertion hole 17 via the sealing material 8 made of the crystallized glass. In other words, one end of each of the cells 1 is individually bonded to and supported by the support 7a by using the sealing material 8. Next, the above-mentioned predetermined jig is removed from the plurality of cells 1.

Next, the support 7a is bonded to the gas tank 7b so as to complete the cell stack device 10.

Module

Figure 7:
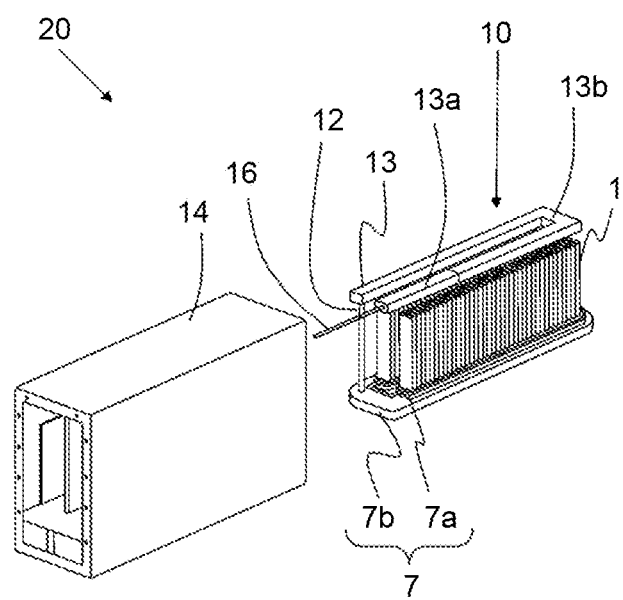
FIG. 7 is an exterior perspective view illustrating a module that includes one example of the cell stack device according to the embodiments.

Next, a module will be explained with reference to FIG. 7, for which the above-mentioned cell stack device of the embodiments according to the present disclosure is employed. FIG. 7 is an exterior perspective view illustrating the module that includes one example of the cell stack device according to the embodiments.

As illustrated in FIG. 7, a module 20 houses the cell stack device 10 in a storage container 14 thereof. The reformer 13 is arranged on or above the cell stack device 10, which generates fuel gas to be supplied to the cells 1.

The reformer 13 illustrated in FIG. 7 reforms raw fuel such as natural gas and kerosene, which is supplied via a raw-fuel supplying tube 16, so as to generate fuel gas. It is preferable that the reformer 13 has a structure capable of steam reforming that is an efficient reforming reaction, and thus the reformer 13 includes a vaporization unit 13a that vaporizes water and a reforming unit 13b in which a reforming catalyst (not illustrated) for reforming raw fuel into fuel gas is arranged. Fuel gas generated by the reformer 13 is supplied to the manifold 7 via the gas flow tube 12, and then is further supplied, from the manifold 7, to the gas flow paths arranged in the cells 1.

In FIG. 7, there is illustrated a state where a part (front and back surfaces) of the storage container 14 are removed, and the cell stack device 10 housed therein is moved therefrom in the back direction.

In the module 20 having the above-mentioned configuration, a temperature in the module 20 during normal power generation is 500 to 1000° C. in accordance with the above-mentioned firing or power generation of the cells 1.

As described above, the module 20 is configured to house therein the cell stack device 10 whose long-term reliability is improved, so that it is possible to improve long-term reliability of the module 20.

Module Housing Device

Figure 8:
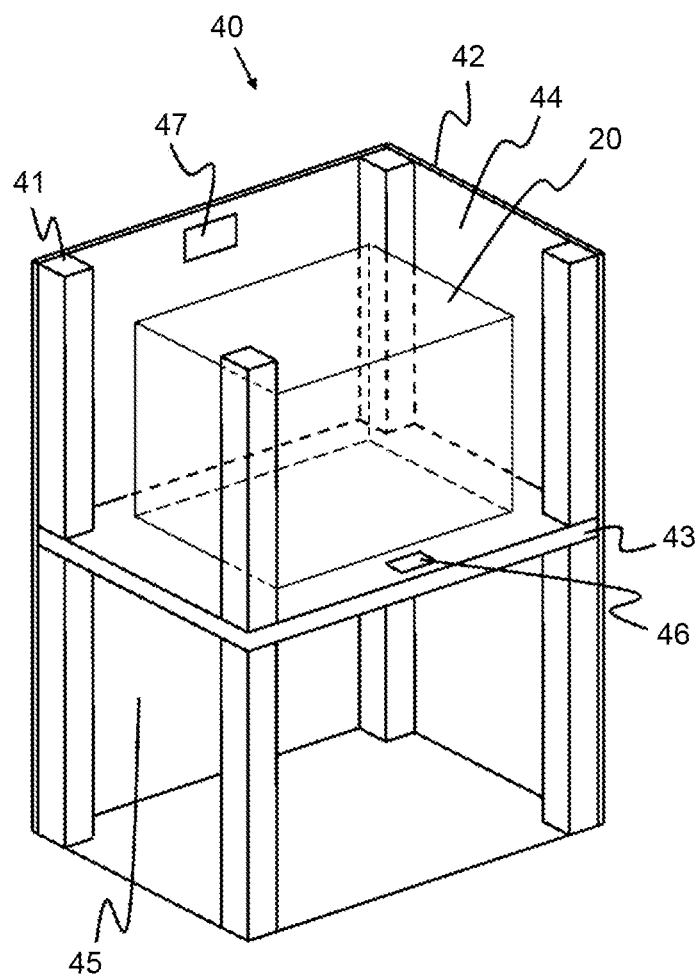
FIG. 8 is an exploded perspective view schematically illustrating one example of a module housing device according to embodiments.

FIG. 8 is an exploded perspective view illustrating one example of the module housing device according to the embodiments that houses, in its external case, the module 20 illustrated in FIG. 7 and an auxiliary (not illustrated) that operates the module 20. Note that in FIG. 8, a part of the configuration is omitted.

A module housing device 40 illustrated in FIG. 8 is configured such that the inside of an external case constituted of pillars 41 and external plates 42 is vertically divided by a partition plate 43, the upper part is a module housing chamber 44 that houses therein the above-mentioned module 20, and the lower part is an auxiliary housing chamber 45 that houses therein an auxiliary for operating the module 20. Note that illustration of the auxiliary housed in the auxiliary housing chamber 45 is omitted.

An air vent port 46 through which air in the auxiliary housing chamber 45 flows into the module housing chamber 44 is provided to the partition plate 43, and an exhaust port 47 that exhausts air in the module housing chamber 44 is arranged on a part of the external plates 42 constituting the module housing chamber 44.

As described above, the module housing device 40 is configured such that the module housing chamber 44 houses therein the module 20 whose long-term reliability is improved, and the auxiliary housing chamber 45 houses therein the auxiliary for operating the module 20, so that it is possible to improve long-term reliability of the module housing device 40.

As described above, the present disclosure is specifically explained; however, the present disclosure is not limited to the above-mentioned embodiments, and various substitutions and changes in the form of the embodiments described herein may be made without departing from the spirit of the disclosure.

In the embodiments, i.e. "vertically-striped" configuration is employed in which the single element part a, constituted of an inner-side electrode (fuel electrode layer) 3, the solid electrolyte layer 4, and an outer-side electrode (air electrode layer) 5, is arranged on a surface of the support substrate 2; however, i.e. "horizontally-striped" cell may be employed in which the element parts a are arranged at a plurality of respective separated positions on the surface of the support substrate 2, and the adjacent element parts a are electrically connected to each other.

In the above-mentioned embodiments, the support substrate 2 has a plate-shaped body; however, the support substrate 2 may have a cylindrical-shaped body. In this case, an inner space of the cylindrical support substrate 2 functions as the gas flow path 2a.

In the above-mentioned cell 1 according to the embodiments, the fuel electrode layer 3 and the air electrode layer 5 may be exchanged with each other, namely, an inner-side electrode may be the air electrode layer 5 and an outer-side electrode may be the fuel electrode layer 3. In this case, flow of gas in which fuel gas and air are exchanged with each other is employed.

The cell 1 may be configured such that the support substrate 2 may serve as the fuel electrode layer 3, and the solid electrolyte layer 4 and the air electrode layer 5 may be sequentially laminated on a surface of the support substrate 2.

Figure 9:
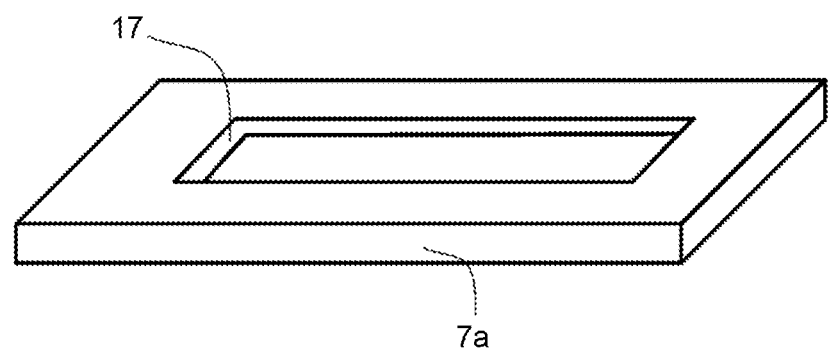
FIG. 9 is a perspective view illustrating another example of a support according to the embodiments.

In the above-mentioned embodiments, as illustrated in FIGS. 4A and 4B, the support 7a is cylindrically-shaped; however, as illustrated in FIG. 9, the support 7a may be plate-shaped. In this case, the gas tank 7b may be bonded to a lower surface of the plate-shaped support 7a so as to form an internal space.

Figure 10A:
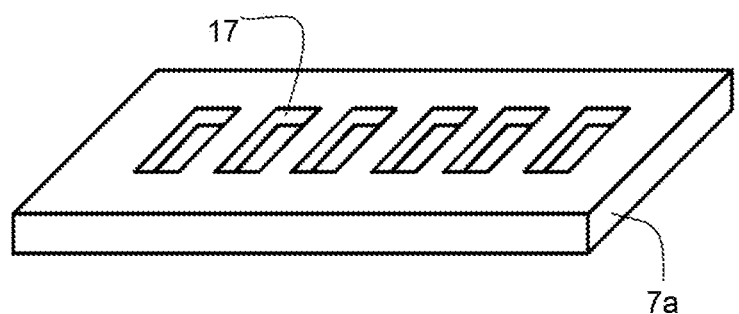
FIG. 10A is a perspective view illustrating another example of the support according to the embodiments.
Figure 10B:
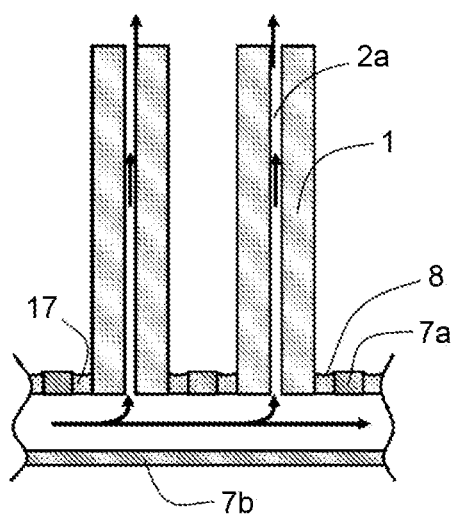
FIG. 10B is an enlarged cross-sectional view illustrating a cell stack device that includes the support illustrated in FIG. 10A.

In the above-mentioned embodiments, as illustrated in FIGS. 4A and 4B, all of the one ends of the cells 1 aligned in one row are inserted into the only one insertion hole 17, which is formed in the support 7a; however, as illustrated in FIGS. 10A and 10B, the cells 1 may be inserted into the plurality of respective insertion holes 17 formed in the support 7a. In this case, the middle layers 21 of all of the cells 1 are bonded to the support 7a of the manifold 7. Furthermore, the two or more cells 1 may be inserted into each of insertion holes formed in the support 7a.

In the above-mentioned embodiments, the support is separated from the gas tank; however, the support and the gas tank may be integrated with each other as long as an internal space of the manifold is communicated with gas flow paths of the plurality of cells.

Figure 11:
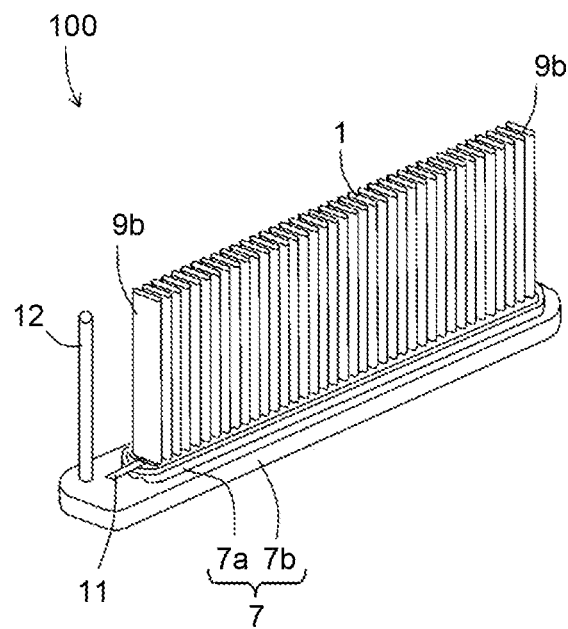
FIG. 11 is a perspective view illustrating another example of the cell stack device according to the embodiments.

In the above-mentioned embodiments, as illustrated in FIG. 2, in the cell stack device, the plurality of cells is aligned in two rows; however, as illustrated in FIG. 11, the plurality of cells may be aligned in single row in the cell stack device (cell stack device 100).

In the above-mentioned embodiments, a fuel battery cell, a fuel battery cell stack device, a fuel battery module, and a fuel battery device are indicated as examples of "cell", "cell stack device", "module", and "module housing device"; however, may be an electrolytic cell, an electrolytic cell device, an electrolytic module, and an electrolytic device as another example.

Figure 12:
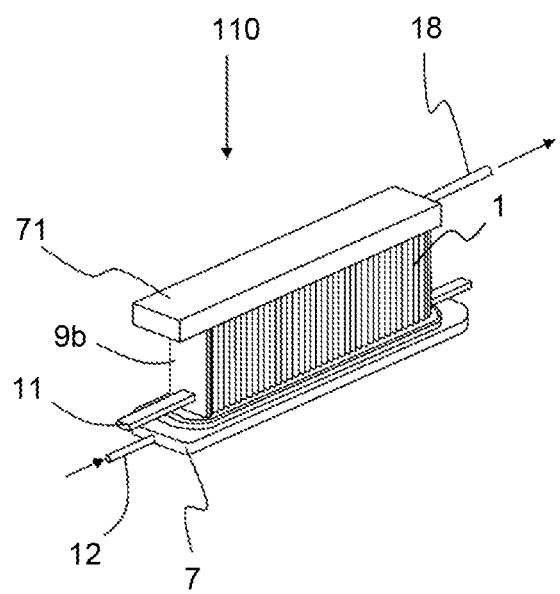
FIG. 12 is a perspective view illustrating another example of the cell stack device according to the embodiments.

FIG. 12 is a diagram illustrating one example (cell stack device 110) of the electrolytic cell device. The other end parts (upper end parts) of the cells 1 are fixed to another manifold 71 by using the sealing material 8, the manifold 7 is a supply unit that supplies high-temperature water vapor, and the other manifold 71 is a recovery unit that recovers generated hydrogen. In the example illustrated in FIG. 12, the gas flow tube 12 supplies water vapor, and a gas flow tube 18 recovers hydrogen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell stack device comprising:

a support member;

at least one cell on the support member, the at least one cell comprising a fuel electrode layer, a solid electrolyte layer, a first middle layer located on the solid electrolyte layer, the first middle layer comprising a first region and a second region on a surface opposite the solid electrolyte layer, a second middle layer located directly on the second region of the first middle layer and not on the first region of the first middle layer, and an air electrode layer that is located on the second middle layer, wherein the first middle layer and the second middle layer collectively form a middle layer that prevents a reaction between a component of the solid electrolyte layer and a component of the air electrode layer, wherein the second middle layer is longer than the air electrode layer from one end of the at least one cell to an opposing end of the at least one cell; and a sealing material located between the support member and the first region of the first middle layer, the sealing material bonded to the first region of the first middle layer without being bonded to the second middle layer on the second region of the first middle layer.

2. The cell stack device according to claim 1, wherein the at least one cell further comprises a first layer on a same surface of the solid electrolyte layer as the first middle layer, wherein both the solid electrolyte layer and the first layer contain a rare earth element, wherein a content of the rare earth element in the first layer is different from a content of the rare earth element in the solid electrolyte layer, and wherein the first layer and the first middle layer are bonded to each other.

3. The cell stack device according to claim 2, wherein the sealing material is located between the support member and both the first layer and the first region of the first middle layer, and bonded to both the first layer and the first region of the first middle layer.

4. A module comprising:

a storage container; and the cell stack device according to claim 1, wherein the storage container houses therein the cell stack device.

5. A module housing device comprising:
an external case comprising a module housing chamber and an auxiliary housing chamber that is separate from the module housing chamber; and
the module according to claim 4 contained within the module housing chamber.

* * * * *